United States Patent
Kwon et al.

(10) Patent No.: US 9,954,203 B2
(45) Date of Patent: *Apr. 24, 2018

(54) STEPPED ELECTRODE GROUP STACK

(71) Applicant: LG Chem, Ltd., Seoul (KR)

(72) Inventors: Sungjin Kwon, Daejeon (KR); Ki Woong Kim, Daejeon (KR); Dong-Myung Kim, Daejeon (KR)

(73) Assignee: LG Chem, Ltd. (KR)

( * ) Notice: Subject to any disclaimer, the term of this patent is extended or adjusted under 35 U.S.C. 154(b) by 386 days.

This patent is subject to a terminal disclaimer.

(21) Appl. No.: 13/845,709

(22) Filed: Mar. 18, 2013

(65) Prior Publication Data

US 2014/0255756 A1 Sep. 11, 2014

Related U.S. Application Data

(63) Continuation of application No. PCT/KR2013/002130, filed on Mar. 15, 2013.

(Continued)

(51) Int. Cl.
*H01M 10/00* (2006.01)
*H01M 2/02* (2006.01)
(Continued)

(52) U.S. Cl.
CPC ..... *H01M 2/0212* (2013.01); *H01M 10/0436* (2013.01); *H01M 10/052* (2013.01); *H01M 10/0585* (2013.01)

(58) Field of Classification Search
CPC ........... H01M 10/0436; H01M 2/0212; H01M 10/0431; H01M 10/0585
See application file for complete search history.

(56) References Cited

U.S. PATENT DOCUMENTS 2,702,310 A 2/1955 Kaye et al.
3,442,717 A 5/1969 Horn et al.
(Continued)

FOREIGN PATENT DOCUMENTS

CN 1314008 A 9/2001
CN 1363121 A 8/2002
(Continued)

OTHER PUBLICATIONS

Machine translation of KR 10-2003-0066960, obtained Feb. 25, 2016.*
(Continued)

*Primary Examiner* — Nicholas P D'Aniello
(74) *Attorney, Agent, or Firm* — Lerner, David, Littenberg, Krumholz & Mentlik, LLP

(57) ABSTRACT

Disclosed herein is an electrode group stack including a plurality of electrode groups, each of which includes a cathode, an anode, and a first separator disposed between the cathode and the anode, and a second separator disposed between the electrode groups, wherein the electrode groups are stacked in a height direction on the basis of a plane, some or all of the electrode groups have different areas of opposite stack surfaces at a stack interface therebetween, and the electrode group stack includes an electrode group satisfying equation (1): T≥(Tsum×0.5) (1), where T indicates a thickness of an arbitrary electrode group and Tsum indicates a sum of thicknesses of the electrode groups constituting the electrode group stack.

26 Claims, 7 Drawing Sheets

Related U.S. Application Data

(60) Provisional application No. 61/775,037, filed on Mar. 8, 2013.

(51) Int. Cl.
    *H01M 10/04*     (2006.01)
    *H01M 10/052*     (2010.01)
    *H01M 10/0585*     (2010.01)

(56) References Cited

U.S. PATENT DOCUMENTS

| | | |
|---|---|---|
| 4,092,464 A | 5/1978 | Dey et al. |
| 4,964,877 A | 10/1990 | Keister et al. |
| 5,582,931 A | 12/1996 | Kawakami |
| 5,633,097 A | 5/1997 | Miller |
| 5,652,074 A | 7/1997 | Larson, III et al. |
| 6,040,078 A | 3/2000 | Fauteux et al. |
| 6,224,995 B1 | 5/2001 | Fauteux et al. |
| 6,300,002 B1 | 10/2001 | Webb et al. |
| 6,423,449 B1 | 7/2002 | Hong |
| 6,498,951 B1 | 12/2002 | Larson et al. |
| 6,610,443 B2 | 8/2003 | Paulot et al. |
| 6,946,220 B2 | 9/2005 | Probst et al. |
| 7,285,334 B1 | 10/2007 | Yamashita et al. |
| 7,479,349 B2 | 1/2009 | O'Phelan et al. |
| 7,595,132 B2 | 9/2009 | Kang et al. |
| 9,196,898 B2* | 11/2015 | Kwon ............... H01M 2/266 |
| 9,246,185 B2 | 1/2016 | Kretschmar et al. |
| 9,252,452 B2* | 2/2016 | Kwon ............... H01M 2/266 |
| 2001/0005561 A1 | 6/2001 | Yamada et al. |
| 2002/0119367 A1 | 8/2002 | Watanabe et al. |
| 2002/0122975 A1 | 9/2002 | Spillman et al. |
| 2002/0160257 A1* | 10/2002 | Lee ..................... H01M 6/46 |
| | | 429/130 |
| 2003/0013012 A1 | 1/2003 | Ahn et al. |
| 2003/0039883 A1 | 2/2003 | Notten et al. |
| 2003/0077509 A1 | 4/2003 | Probst et al. |
| 2004/0119442 A1 | 6/2004 | Lee et al. |
| 2005/0164094 A1 | 7/2005 | Kotato et al. |
| 2005/0214642 A1 | 9/2005 | Kim et al. |
| 2006/0172185 A1 | 8/2006 | Mimura |
| 2006/0269842 A1 | 11/2006 | Ichinose et al. |
| 2006/0275661 A1 | 12/2006 | Kim et al. |
| 2006/0286456 A1 | 12/2006 | Fu et al. |
| 2007/0054180 A1 | 3/2007 | Miyajima et al. |
| 2007/0059595 A1 | 3/2007 | Endo et al. |
| 2007/0099078 A1 | 5/2007 | Zhang et al. |
| 2007/0202401 A1 | 8/2007 | Viavattine |
| 2007/0218355 A1 | 9/2007 | Ryu et al. |
| 2007/0287064 A1 | 12/2007 | Suzuki et al. |
| 2008/0137890 A1 | 6/2008 | Petersen et al. |
| 2009/0023057 A1 | 1/2009 | Kim |
| 2009/0027831 A1* | 1/2009 | Tasaki ............... H01M 4/0404 |
| | | 361/523 |
| 2009/0075168 A1 | 3/2009 | Lee |
| 2009/0123829 A1 | 5/2009 | Kim et al. |
| 2009/0159582 A1 | 6/2009 | Chami et al. |
| 2009/0325043 A1 | 12/2009 | Yoon et al. |
| 2010/0047685 A1 | 2/2010 | Lee et al. |
| 2010/0112451 A1 | 5/2010 | Shibutani et al. |
| 2010/0279161 A1 | 11/2010 | Kang et al. |
| 2010/0319187 A1 | 12/2010 | Kim et al. |
| 2011/0052952 A1 | 3/2011 | Roh et al. |
| 2011/0064991 A1 | 3/2011 | Ahn |
| 2011/0183183 A1* | 7/2011 | Grady ............... H01M 2/1022 |
| | | 429/152 |
| 2011/0274955 A1 | 11/2011 | Park et al. |
| 2011/0287308 A1 | 11/2011 | Kim et al. |
| 2012/0015223 A1 | 1/2012 | Bhardwaj et al. |
| 2012/0015236 A1 | 1/2012 | Spare |
| 2012/0107654 A1 | 5/2012 | Bhardwaj et al. |
| 2012/0129037 A1 | 5/2012 | Hohenthanner et al. |
| 2012/0135299 A1 | 5/2012 | Kwon et al. |
| 2012/0156551 A1 | 6/2012 | Cho |
| 2012/0183825 A1 | 7/2012 | Lee et al. |
| 2012/0202105 A1 | 8/2012 | Shinyashiki et al. |
| 2012/0225345 A1 | 9/2012 | Kim |
| 2013/0019732 A1 | 1/2013 | Yotsumoto |
| 2013/0108906 A1 | 5/2013 | Bhardwaj et al. |
| 2013/0144167 A1 | 6/2013 | Lee et al. |
| 2013/0344360 A1 | 12/2013 | Miyajama et al. |
| 2014/0011071 A1 | 1/2014 | Suzuki |
| 2014/0093762 A1 | 4/2014 | Goh et al. |

FOREIGN PATENT DOCUMENTS

| | | |
|---|---|---|
| CN | 1799162 A | 7/2006 |
| CN | 101107736 A | 1/2008 |
| EP | 1309018 A2 | 5/2003 |
| EP | 1326680 A1 | 7/2003 |
| EP | 1416571 A1 | 5/2004 |
| JP | 02-056856 | 2/1990 |
| JP | 05-234598 | 9/1993 |
| JP | 06-260209 | 9/1994 |
| JP | 08-171930 | 7/1996 |
| JP | 09-063591 | 3/1997 |
| JP | 09-082361 | 3/1997 |
| JP | H10188938 A | 7/1998 |
| JP | 10-270014 | 10/1998 |
| JP | H10296879 A | 11/1998 |
| JP | 2000133317 A | 5/2000 |
| JP | 2001028275 A | 1/2001 |
| JP | 2001068155 A | 3/2001 |
| JP | 2001167743 A | 6/2001 |
| JP | 2001357892 A | 12/2001 |
| JP | 2002199910 A | 7/2002 |
| JP | 2002252023 A | 9/2002 |
| JP | 2002260600 A | 9/2002 |
| JP | 2002-343350 A | 11/2002 |
| JP | 2003217601 A | 7/2003 |
| JP | 2003523060 A | 7/2003 |
| JP | 2003234094 A | 8/2003 |
| JP | 2003303622 A | 10/2003 |
| JP | 2004111219 A | 4/2004 |
| JP | 3611765 B2 | 1/2005 |
| JP | 2005169728 A | 6/2005 |
| JP | 3680797 B2 | 8/2005 |
| JP | 2006127882 A | 5/2006 |
| JP | 2006134604 A | 5/2006 |
| JP | 2006236994 A | 9/2006 |
| JP | 2006-278331 A | 10/2006 |
| JP | 2007073207 A | 3/2007 |
| JP | 2008021634 A | 1/2008 |
| JP | 2008300141 A | 12/2008 |
| JP | 2009-218105 A | 9/2009 |
| JP | 2010176980 A | 8/2010 |
| JP | 2011003518 A | 1/2011 |
| JP | 2011-081931 A | 4/2011 |
| JP | 2011517831 A | 6/2011 |
| JP | 2011204613 A | 10/2011 |
| KR | 2020000005813 U | 4/2000 |
| KR | 20-0207948 | 1/2001 |
| KR | 1020010055968 A | 7/2001 |
| KR | 20010104150 A | 11/2001 |
| KR | 1020030066960 A | 8/2003 |
| KR | 20040054113 A | 6/2004 |
| KR | 20050020357 A | 3/2005 |
| KR | 20050036466 A | 4/2005 |
| KR | 20060027281 A | 3/2006 |
| KR | 100670492 B1 | 1/2007 |
| KR | 20070066401 A | 6/2007 |
| KR | 1020070075941 A | 7/2007 |
| KR | 1020070099068 A | 10/2007 |
| KR | 20080022915 A | 3/2008 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 A | 1/2009 |
| KR | 10-0884945 B1 | 2/2009 |
| KR | 20090028243 A | 3/2009 |
| KR | 20090062409 A | 6/2009 |
| KR | 20090097731 A | 9/2009 |

(56) References Cited

FOREIGN PATENT DOCUMENTS

| KR | 100987300 B1 | 10/2010 |
|----|--------------|---------|
| KR | 20100137290 A | 12/2010 |
| KR | 20110025023 A | 3/2011 |
| KR | 20110105737 A | 9/2011 |
| KR | 20110112241 A | 10/2011 |
| KR | 20110128594 A | 11/2011 |
| KR | 20120060706 A | 6/2012 |
| KR | 20120082808 A | 7/2012 |
| WO | 0072392 A1 | 11/2000 |
| WO | 024317 A1 | 5/2002 |
| WO | 2012-009423 A1 | 1/2012 |
| WO | 2012053772 A2 | 4/2012 |
| WO | 2013054593 A1 | 4/2013 |
| WO | 2013141279 A1 | 9/2013 |
| WO | 2013-180378 A1 | 12/2013 |

OTHER PUBLICATIONS

Inernational Search Report for Application No. PCT/KR2013/001815 dated Jun. 27, 2013.
International Search Report for Application No. PCT/KR2013/002118 dated Jun. 28, 2013.
International Search Report for Application No. PCT/KR2013/002127 dated Jun. 27, 2013.
Chinese Office Action for Application No. 201380002792.X dated Apr. 3, 2015.
Machine translation of KR 2003-0066960 (Jang).
International Search Report from PCT/KR2013/002130, dated Dec. 10, 2013.
Extended Search Report from European Application No. 13797719.5, dated Feb. 12, 2016.

* cited by examiner

[FIG. 1A] Prior Art
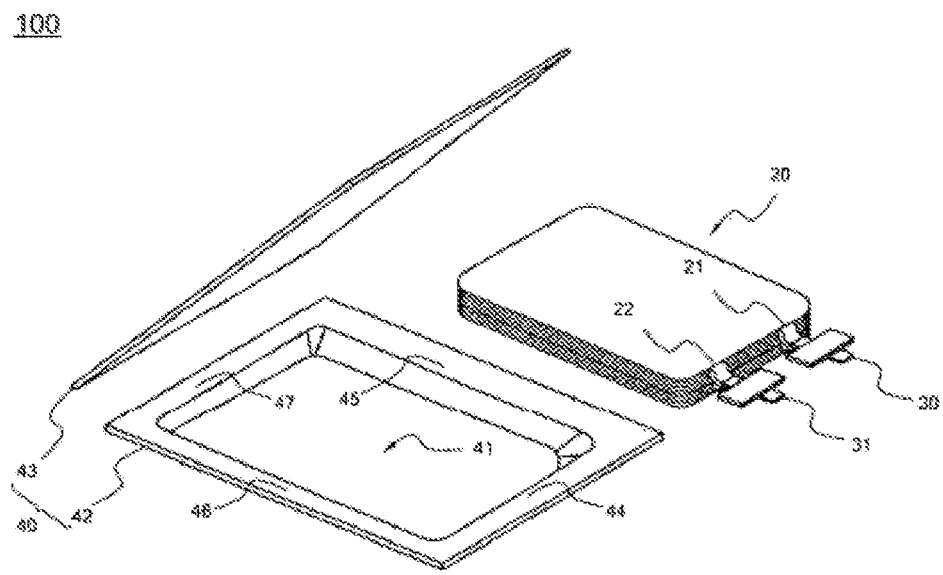
[FIG. 1B] Prior Art
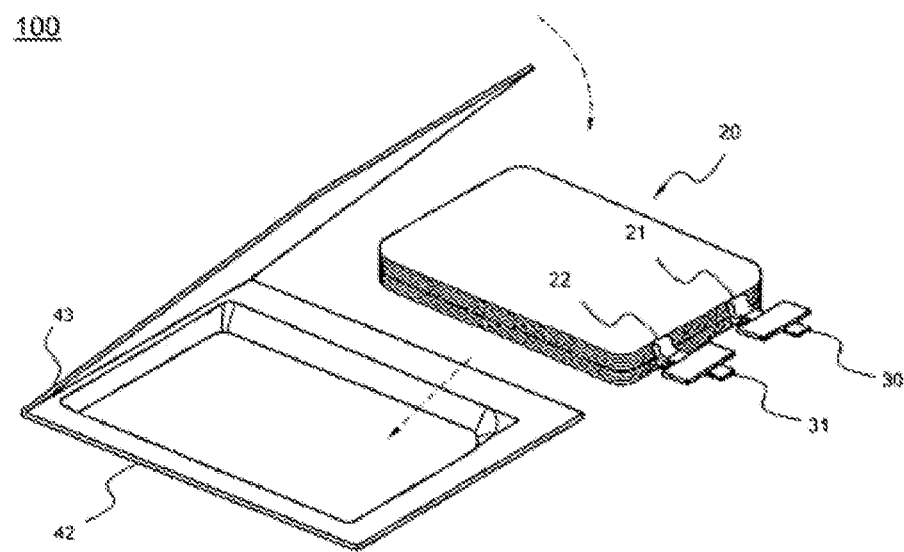

[FIG. 2]
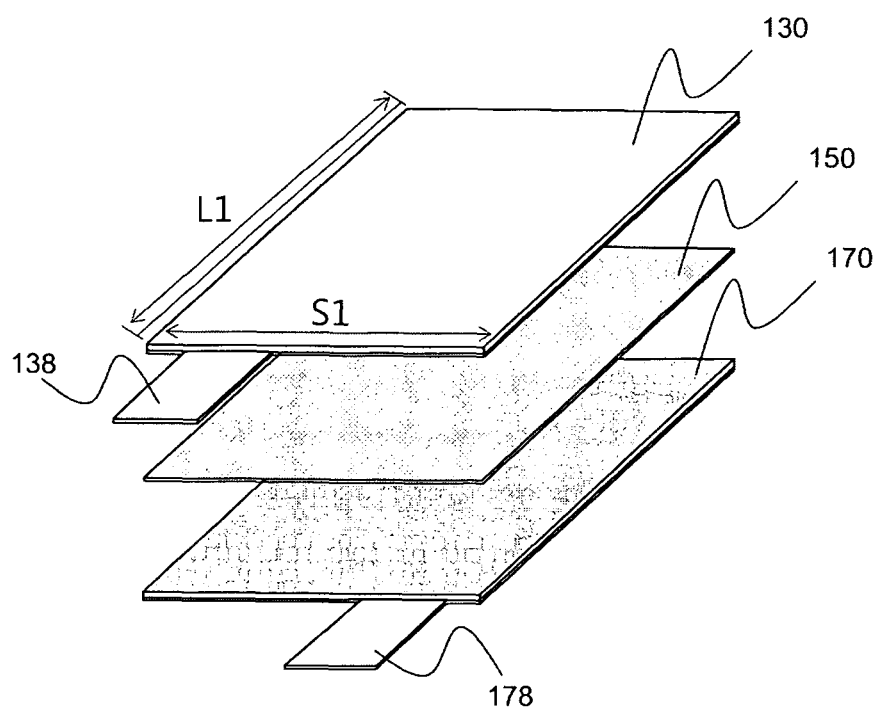
[FIG. 3]
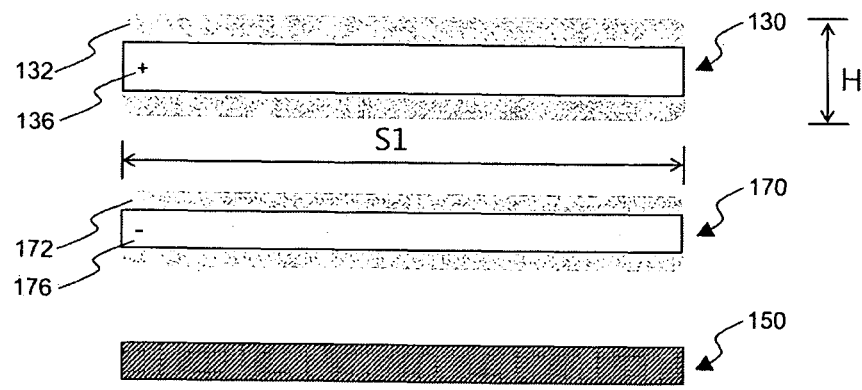

[FIG. 4]
300
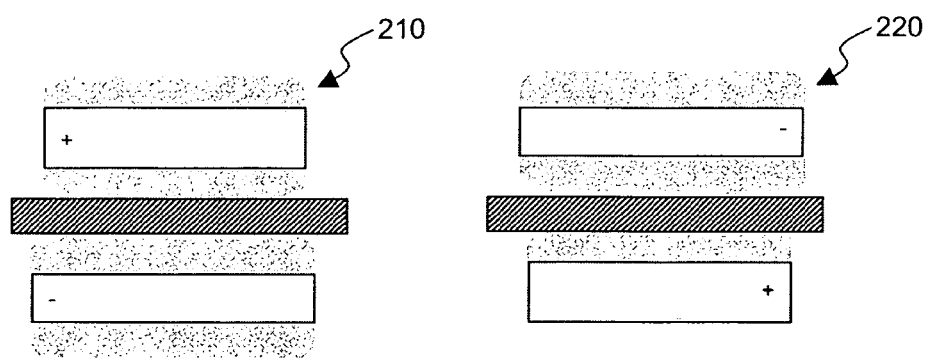
[FIG. 5]
300
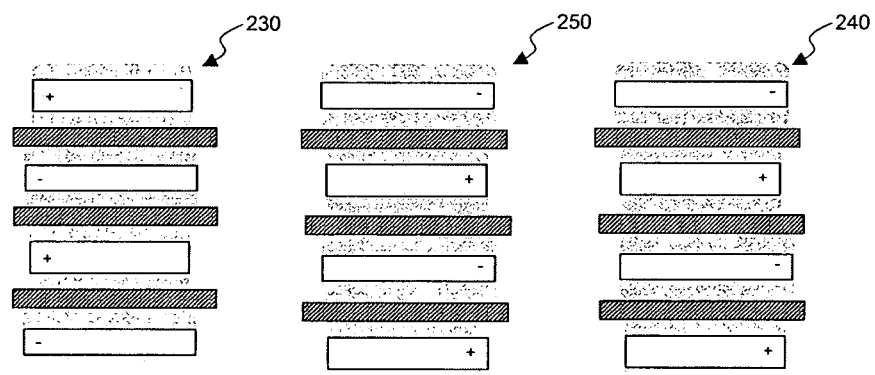

[FIG. 6]
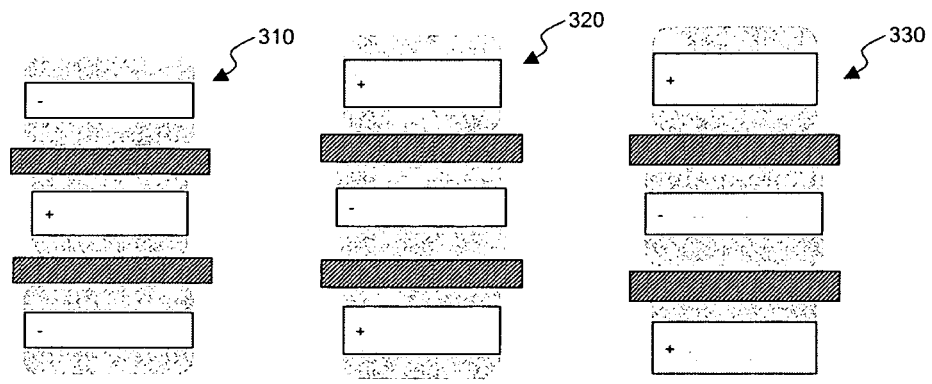
[FIG. 7]
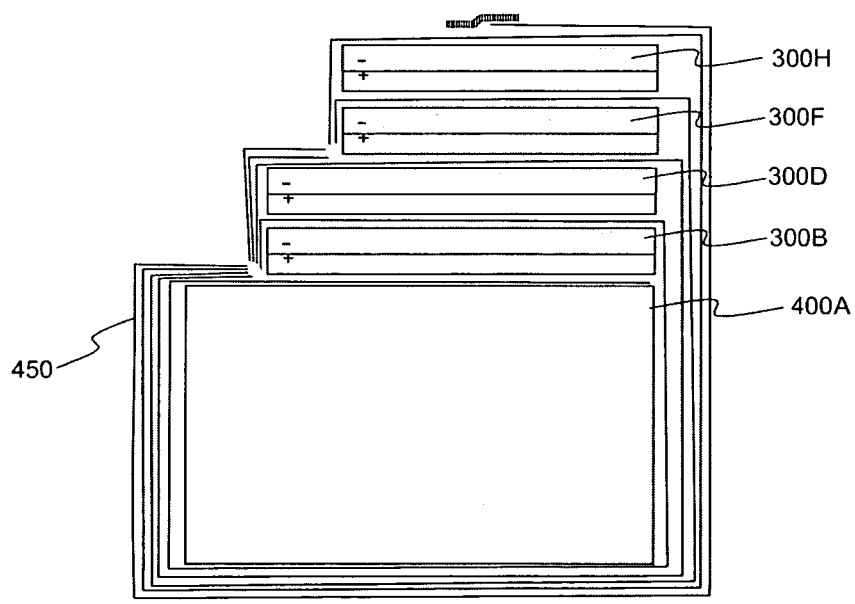

[FIG. 8]
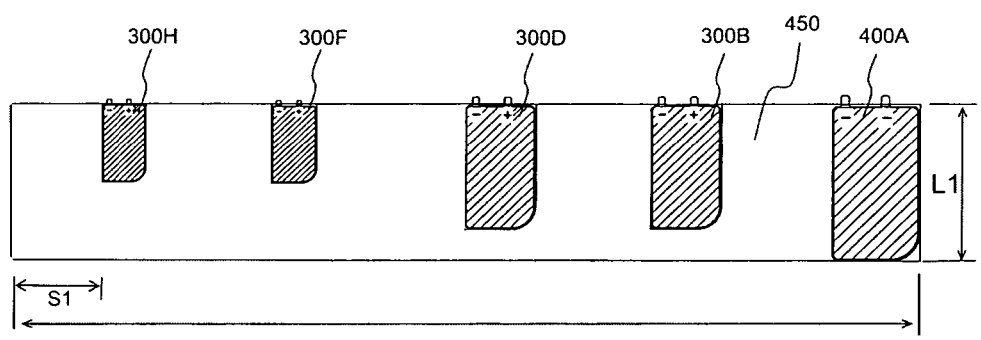
[FIG. 9]
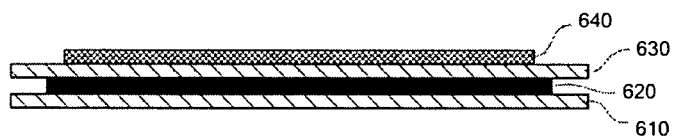
[FIG. 10]
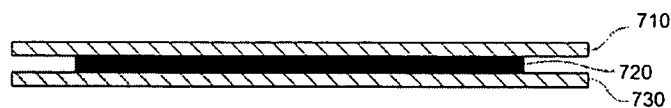

[FIG. 11]
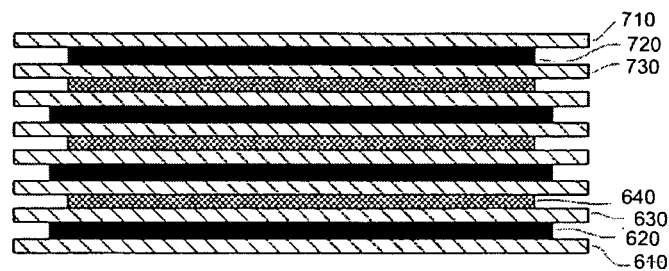
[FIG. 12]
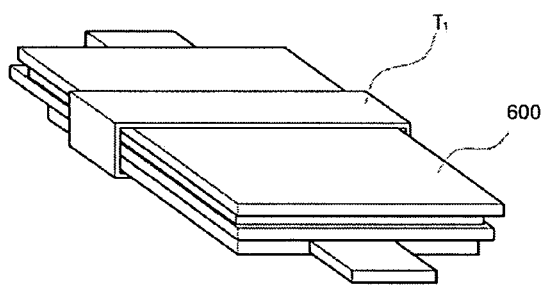
(a)
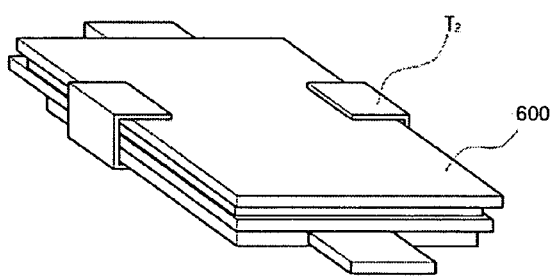
(b)

[FIG. 13]
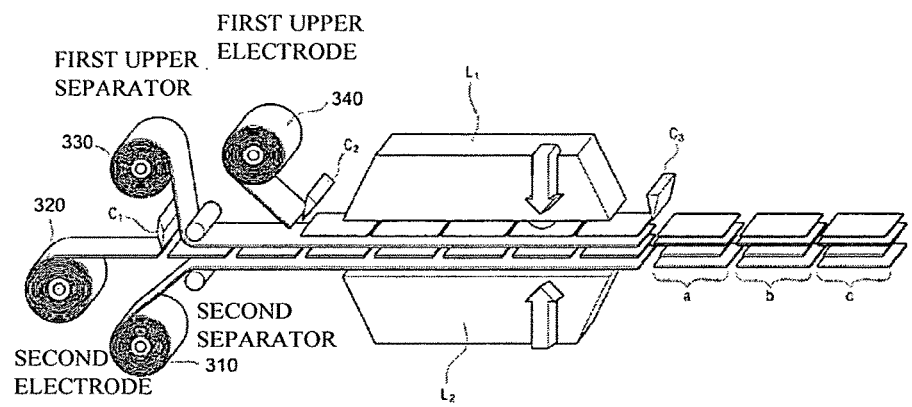
[FIG. 14]
400
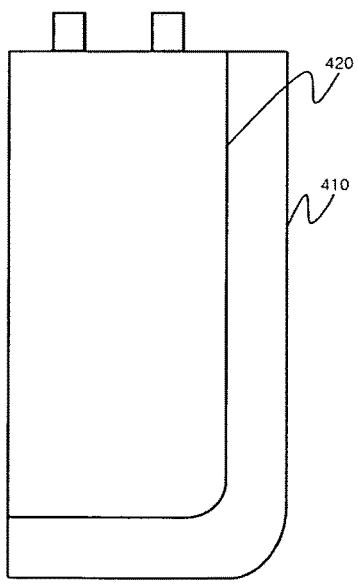

STEPPED ELECTRODE GROUP STACK

CROSS REFERENCE TO RELATED APPLICATIONS

The present application is a continuation of International Application No. PCT/KR2013/002130 filed Mar. 15, 2013, which claims the benefit of the filing date of U.S. Provisional Patent Application No. 61/775,037 filed on Mar. 8, 2013, the disclosures of which are hereby incorporated herein by reference.

TECHNICAL FIELD

The present invention relates to an electrode group stack mounted in a battery case of a secondary battery and, more particularly, to a stepped electrode group stack.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Lithium secondary batteries are very important to realize such a ubiquitous society.

Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide powers and capacities suitable for devices to which the lithium secondary batteries are applied. In addition, there is a strong need to reduce the size and weight of the lithium secondary batteries.

Small-sized mobile devices, such as mobile phones, personal digital assistants (PDAs), digital cameras, and laptop computers, use one or several small-sized, lightweight battery cells for each device according to the reduction in size and weight of the corresponding products.

On the other hand, middle or large-sized devices, such as electric bicycles, electric motorcycles, electric vehicles, and hybrid electric vehicles, use a middle or large-sized battery module (middle or large-sized battery pack) having a plurality of battery cells electrically connected with each other because high power and large capacity are necessary for the middle or large-sized devices.

Size and weight of a battery module are directly related to a battery module installation space and power of a corresponding middle or large-sized device. For this reason, manufacturers are trying to manufacture small and lightweight battery modules.

A cylindrical battery cell, a prismatic battery cell, and a pouch-shaped battery cell, which are classified based on their shapes, are used as a unit cell of a battery module or battery pack. Among these batteries, the pouch-shaped battery cell, which can be stacked with high integration, has a high energy density per unit weight, is inexpensive, and can be easily modified, has attracted considerable attention.

FIGS. 1A and 1B are exploded perspective views typically showing the general structure of a conventional representative pouch-shaped secondary battery.

Referring to FIG. 1A, a pouch-shaped secondary battery 10 includes an electrode assembly 20 having pluralities of electrode tabs 21 and 22 protruding therefrom, two electrode leads 30 and 31 respectively connected to the electrode tabs 21 and 22, and a battery case 40 to receive the electrode assembly 20 in a sealed state such that portions of the electrode leads 30 and 31 are exposed outward from the battery case 40.

The battery case 40 includes a lower case 42 having a depressed receiving part 41, in which the electrode assembly 20 is located, and an upper case 43 to cover the lower case 42 such that the electrode assembly 20 is sealed in the battery case 40.

The upper case 43 and the lower case 42 are connected to each other by thermal welding in a state in which the electrode assembly 20 is mounted therein to form an upper end sealed part 44, side sealed parts 45 and 46, and a lower end sealed part 47.

As shown in FIG. 1A, the upper case 43 and the lower case 42 may be configured as separate members. As shown in FIG. 1B, on the other hand, one end of the upper case 43 may be integrally formed at a corresponding end of the lower case 42 such that the upper case 43 and the lower case 42 may be hingedly connected to each other.

In addition, as shown in FIGS. 1A and 1B, the pouch-shaped battery cell is configured to have a structure in which electrode terminals constituted by the electrode tabs and the electrode leads connected to the electrode tabs are formed at one end of the stacked type electrode assembly. Alternatively, a pouch-shaped battery cell configured to have a structure in which electrode terminals are formed at one end and the other end of an electrode assembly may also be manufactured using the above method.

DISCLOSURE

Technical Problem

As shown in FIGS. 1A and 1B, the electrode assembly is generally manufactured so as to have an approximately rectangular parallelepiped structure. The electrode assembly is mounted in a battery case to manufacture a pouch-shaped battery cell having a rectangular parallelepiped structure. A plurality of such pouch-shaped battery cells is stacked to constitute a battery pack having a rectangular parallelepiped structure.

However, a device, to which the battery cell having the rectangular parallelepiped structure or the battery pack having the rectangular parallelepiped structure is applied, is not generally formed in the shape of a rectangular parallelepiped.

For example, sides of a smartphone may be curved to improve grip.

In a case in which the battery cell having the rectangular parallelepiped structure or the battery pack having the rectangular parallelepiped structure is mounted in a device designed so as to have such curved portions, however, space utilization of the device may be lowered.

That is, the curved portions of the device have dead spaces, in which the battery cell or the battery pack cannot be mounted. Ultimately, such dead spaces lower the capacity of the device per unit volume.

Therefore, the present invention has been made to solve the above problems, and it is an object of the present invention to provide a stepped electrode group stack that is capable of maximally improving the capacity of a device per unit volume and a lithium secondary battery cell including the same.

It is another object of the present invention to provide a stepped electrode group stack configured such that process difficulty generated during mass production of stepped electrode group stacks is minimized, thereby improving yield of the stepped electrode group stacks.

Technical Solution

In accordance with one aspect of the present invention, the above and other objects can be accomplished by the provision of an electrode group stack including a plurality of electrode groups, each of which includes a cathode, an anode, and a first separator disposed between the cathode and the anode, and a second separator disposed between the electrode groups, wherein the electrode groups are stacked in a height direction on the basis of a plane, some or all of the electrode groups have different areas of opposite stack surfaces at a stack interface therebetween, and the electrode group stack includes an electrode group satisfying equation (1): $T \geq (Tsum \times 0.5)$ (1), where T indicates a thickness of an arbitrary electrode group and Tsum indicates a sum of thicknesses of the electrode groups constituting the electrode group stack.

The arbitrary electrode group may mean any one selected from among the electrode groups constituting the electrode group stack. For example, the arbitrary electrode group may be a stacked type electrode group having the largest area of the stack surface.

The cathode may be configured to have a structure in which a cathode slurry layer is formed on a cathode current collector.

The cathode may have a cathode slurry layer formed only at an area of the cathode facing the anode.

The surface of the cathode facing the anode may be one major surface or each major surface of the cathode current collector.

The cathode may be a plate-shaped cathode, i.e. a cathode plate. The cathode plate may have right-angled corners or curved corners. For example, all the corners of the cathode plate formed in the shape of a rectangular parallelepiped may be right-angled. Alternatively, at least one of the corners of the cathode plate may be curved.

In a case in which at least one of the corners of the cathode plate is curved as described above, impact applied to the curved corner of the cathode plate is reduced when the electrode group stack is dropped, thereby improving safety.

A single-sided cathode plate may have a maximum thickness of 87 to 92 μm. The single-sided cathode plate may have a minimum thickness of 70 to 74 μm. In this case, a loading level of cathode slurry may be 16 mg/cm² to 22 mg/cm².

A double-sided cathode plate may have a maximum thickness of 128 to 133 μm. The double-sided cathode plate may have a minimum thickness of 91 to 99 μm. In this case, a loading level of cathode slurry may be 32 mg/cm² to 44 mg/cm².

The thickness of the cathode current collector of the single-sided cathode plate may be larger than that of the cathode current collector of the double-sided cathode plate. A ratio of the thickness of the cathode current collector of the single-sided cathode plate to the thickness of the cathode current collector of the double-sided cathode plate may be 2.5:1 to 1.5:1.

In a case in which the thickness of the cathode current collector of the single-sided cathode plate is larger than that of the cathode current collector of the double-sided cathode plate, it is possible to minimize bending of the single-sided cathode plate when the single-sided cathode is roll pressed.

As a result, yield and manufacturing efficiency may be improved.

The anode may be configured to have a structure in which an anode slurry layer is formed on an anode current collector.

The anode may have an anode slurry layer formed only at an area of the anode facing the cathode. The surface of the anode facing the cathode may be one major surface or each major surface of the anode current collector.

The anode may be a plate-shaped anode, i.e. an anode plate. The anode plate may have right-angled corners or curved corners. For example, all the corners of the anode plate formed in the shape of a rectangular parallelepiped may be right-angled. Alternatively, at least one of the corners of the anode plate may be curved.

In a case in which at least one of the corners of the anode plate is curved as described above, impact applied to the curved corner of the anode plate is reduced when the electrode group stack is dropped, thereby improving safety.

A single-sided anode plate may have a maximum thickness of 86 to 91 μm. The single-sided anode plate may have a minimum thickness of 67 to 70 μm. In this case, a loading level of anode slurry may be 7.7 mg/cm² to 10.5 mg/cm².

A double-sided anode plate may have a maximum thickness of 139 to 149 μm. The double-sided anode plate may have a minimum thickness of 101 to 108 μm. In this case, a loading level of anode slurry may be 15.4 mg/cm² to 21 mg/cm².

The thickness of the anode current collector of the single-sided anode plate may be larger than that of the anode current collector of the double-sided anode plate. A ratio of the thickness of the anode current collector of the single-sided anode plate to the thickness of the anode current collector of the double-sided anode plate may be 2.5:1 to 1.5:1.

In a case in which the thickness of the anode current collector of the single-sided anode plate is larger than that of the anode current collector of the double-sided anode plate, it is possible to minimize bending of the single-sided anode when the single-sided anode is roll pressed.

As a result, yield and manufacturing efficiency may be improved.

The first separator may be a plate-shaped separator, i.e. a separator plate.

Each of the electrode groups may be a stacked type electrode group including a cathode plate, an anode plate, and a first plate-shaped separator disposed between the cathode plate and the anode plate, the cathode plate and the anode plate being are stacked in the height direction on the basis of the plane in a state in which a separator plate is between the cathode plate and the anode plate.

In the above description, the plane may be any plane. For example, the plane may be the ground or a plane perpendicular to the ground.

The electrode plates may be stacked in the direction of gravity or in the opposite direction of gravity.

For example, the expression "the electrode plates are stacked in the height direction on the basis of the plane" in the above description may mean that the electrode plates may be stacked from the ground in the direction of gravity or in the opposite direction of gravity.

This is equally applied to a case in which the electrode plates are stacked in the direction opposite to the height direction on the basis of the plane.

The second separator disposed between the stacked type electrode groups may be a separation sheet.

The separation sheet may be defined as a separator disposed between the cathode plate and the anode plate to isolate the cathode and the anode from each other and, at the same time, having a sufficient length to cover sides of the cathode plate at which a cathode terminal is not formed or sides of the anode plate at which an anode terminal is not formed.

The separation sheet may cover sides of the stacked type electrode groups, at which electrode terminals are not formed.

That is, the separation sheet may be spaced apart from steps constituting the stepped structure by a predetermined distance. That is, the separation sheet may not tightly contact the outer circumference of each of the steps constituting the stepped structure.

In this case, it may be difficult to form the outer circumference of a lithium secondary battery including the electrode group stack according to the present invention along the curvature of a curved portion of a device in which the lithium secondary battery is mounted.

Preferably, the separation sheet is disposed in tight contact with the sides of the stacked type electrode groups, specifically the outer circumferences of the respective steps constituting the stepped structure.

The separation sheet may have a thickness of 5 to 300 μm, 5 to 200 μm, 5 to 100 μm, 5 to 50 μm, 5 to 30 μm, 5 to 24 μm, 5 to 20 μm, or 10 to 20 μm. As the thickness of the separation sheet is decreased, the discharge capacity of the electrode group stack is increased.

The above conditions are equally applied to the separator plate.

Since the thickness of the separation sheet is very small, it is not easy to achieve tight contact between the separation sheet and the outer circumferences of the respective steps constituting the stepped structure.

According to the present invention, the separation sheet may be cut and/or heated such that the separation sheet tightly contacts the outer circumferences of the respective steps constituting the stepped structure. That is, the separation sheet may tightly contact sides of the electrode groups.

The separation sheet may be disposed between the cathode and the anode while covering the sides of the electrode groups to securely maintain interface contact between the electrode groups and the separation sheet regardless of repetitive charge and discharge.

Tensile force generated during winding of the separation sheet may provide pressure to achieve tight interface contact between the electrode groups and the separation sheet.

The separation sheet may cover a portion or the entirety of the outer circumference of the stack.

The end of the separation sheet may be fixed by thermal welding or taping.

The number of the electrode groups may be even.

The number of the electrode groups may be odd.

The electrode groups may be stacked in the height direction on the basis of the plane. Some or all of the electrode groups may have different areas of opposite stack surfaces at the stack interface therebetween.

As previously described, the plane may be any plane. For example, the plane may be the ground or a plane perpendicular to the ground. One of the electrode groups may be a stacked type electrode group having the largest area of the stack surface.

The electrode groups may be stacked in the height direction and in the direction opposite to the height direction on the basis of the stacked type electrode group having the largest area of the stack surface. In this case, electrode groups may be stacked symmetrically or asymmetrically.

The electrode groups having different areas of opposite stack surfaces at the stack interface therebetween may form a step or a stepped structure.

In a case in which n electrode groups having different areas of the stack surfaces are stacked, the stepped structure may have n steps, where n is a natural number equal to or greater than 2 and may be properly adjusted in consideration of the capacity of a device or the curvature of the outer circumference of the device.

The stacked type electrode group having the largest area of the stack surface may be an S stacked type electrode group, the uppermost electrode and the lowermost electrode of which have the same polarity.

The S stacked type electrode group may be an SA stacked type electrode group, the uppermost electrode and the lowermost electrode of which are anodes.

The S stacked type electrode group may be an SC stacked type electrode group, the uppermost electrode and the lowermost electrode of which are cathodes.

The stacked type electrode group having the largest area of the stack surface may be a D stacked type electrode group, the uppermost electrode and the lowermost electrode of which have different polarities.

The D stacked type electrode group may have a minimum thickness of 0.3 mm.

The stacked type electrode group having the largest area of the stack surface satisfy equation (1) above.

In a case in which the separation sheet is folded or wound to manufacture an electrode group stack according to an unlimited embodiment of the present invention, an even number or an odd number of stacked type electrode groups may be arranged on the separation sheet at predetermined intervals. The electrode group having the largest area of the stack surface located at a winding start point, i.e. the electrode group having the maximum area, may be repeatedly folded or wound from the winding start point to a winding end point in a state in which the electrode group is fixed by a jig used during a folding process.

The jig may be a device, such as clamps, to hold the electrode group when the separation sheet is folded or wound.

In a case in which the electrode group having the maximum area is separated from the jig during folding or winding of the separation sheet, yield or manufacturing efficiency may be lowered. For this reason, the jig may apply uniform force to the electrode group having the maximum area.

If the thickness of the electrode group having the maximum area is less than 50% the sum of thicknesses of the electrode groups, the electrode group having the maximum area may be broken by the force applied thereto.

In accordance with another aspect of the present invention, the electrode groups stacked on the electrode group having the largest area of the stack surface satisfy equation (2): $Ta=n \times Tb$ (2), where Ta and Tb each indicate a thickness of an arbitrary electrode groups selected from among the electrode groups stacked on the electrode group having the largest area of the stack surface and n indicates a natural number.

The arbitrary electrode groups may include S stacked type electrode groups, D stacked type electrode groups, or a combination of the S stacked type electrode groups and the D stacked type electrode groups.

One of the electrodes opposite to each other at the interface between the electrode groups, which has a larger opposite area, may be an anode. In this case, it is possible to minimize dendritic growth during charge of the electrode group stack as compared with in a case in which one of the electrodes opposite to each other at the interface between the electrode groups, which has a larger opposite area, is a cathode.

Alternatively, one of the electrodes opposite to each other at the interface between the electrode groups, which has a larger opposite area, may be a cathode.

The stacked type electrode group may include a first unit cell configured to have a structure in which a cathode plate, an anode plate, and separator plates are laminated while being stacked such that the cathode plate or the anode plate and one of the separator plates are located at the outermost sides of the stacked type electrode group.

The stacked type electrode group may include a second unit cell configured to have a structure in which a cathode plate, an anode plate, and separator plates are laminated while being stacked such that the separator plates are located at the outermost sides of the stacked type electrode group.

For example, the first unit cell may be configured to have a structure in which a cathode plate, a separator plate, an anode plate, and a separator plate are laminated while being sequentially stacked or a structure in which an anode plate, a separator plate, a cathode plate, and a separator plate are laminated while being sequentially stacked.

The stacked type electrode group may include a third unit cell configured to have a structure in which a cathode plate, an anode plate, and a separator plate are laminated while being stacked in a state in which the separator plate is disposed between the cathode plate and the anode plate such that the cathode plate and the anode plate are located at the outermost sides of the stacked type electrode group.

The stacked type electrode group may include a fourth unit cell configured to have a structure in which a cathode plate or an anode plate and a separator plate are laminated while being stacked.

The stacked type electrode group may be configured to have a structure in which only first unit cells are stacked, a structure in which only second unit cells are stacked, a structure in which only third unit cells are stacked, a structure in which only fourth unit cells are stacked, or a structure in which the first, second, third, and fourth unit cells are combined.

The second unit cell may be stacked at the uppermost end or the lowermost end of the first unit cell.

In the structure in which only the second unit cells are stacked, a cathode plate or an anode plate may be disposed between the second unit cells.

A fixing member to more securely maintain the stack structure of the cathode plate, the separator plate, and the anode plate may be added to the first unit cell to the fourth unit cell.

The fixing member may be an additional external member different from the first unit cell to the fourth unit cell. The fixing member may be an adhesive tape or a bonding tape to cover a portion or the entirety of the outside of each unit cell.

The outside of each unit cell may include sides, a top, a front, and a rear.

The fixing member may be a portion of the separator plate constituting each unit cell. In this case, the ends of the separator plate may be thermally welded to fix each unit cell.

The ends of the separator plate may extend such that the separator plate has a length larger than the size of the cathode plate and the anode plate, i.e. the horizontal length or the vertical length. The extending ends of the separator may be connected to each other by thermal welding.

The fixing member is not limited to the above-mentioned construction. For example, the fixing member may include all members that are capable of fixing the first unit cell or the second unit cell.

In a case in which the stacked type electrode group is configured to include the first unit cell and the second unit cell, it possible to improve productivity and yield as compared with the stacked type electrode group configured to have a structure in which the cathode plate, the anode plate, and the separator plate are simply stacked.

In addition, the cathode plate, the separator plate, and the anode plate are laminated in unit of the first unit cell, and therefore, it is possible to minimize expansion in volume of the stacked type electrode group due to swelling.

In a case in which the stacked type electrode group is configured to include the first unit cell and the second unit cell, misalignment of the electrode group caused during a folding process is prevented and omission of processing equipment is possible. Also, it is possible to form the first unit cell or the second unit cell using only one laminator. In addition, it is possible to manufacture the stacked type electrode group by simple stacking. Consequently, damage to electrodes caused during the folding process may be reduced and electrolyte wettability may be improved. Furthermore, a single-sided organic and inorganic composite separator, e.g. a safety reinforced separator (SRS), may be used as the separator plate exposed outside. Consequently, cell thickness may be decreased and, at the same time, processing cost may be reduced.

The electrode group stack according to the present invention has a maximum thickness of 5.5 mm.

Various combinations of the above-mentioned characteristics fall into the scope of the present invention.

In accordance with a further aspect of the present invention, there is provided a lithium secondary battery including the electrode group stack with the above-stated construction, wherein the electrode group stack is mounted in a battery case.

The battery case may be formed of a laminate sheet comprising a resin layer and a metal layer or a metal container.

The battery case may be provided with a receiving part having an internal structure corresponding to an external structure of the electrode group stack.

The lithium secondary battery may be a lithium ion battery, a lithium polymer battery, or a lithium ion polymer battery.

The lithium secondary battery may be used as a power source of a device selected from among a mobile phone, a portable computer, a smartphone, a smart pad, a netbook computer, a light electric vehicle (LEV), an electric vehicle, a hybrid electric vehicle, a plug-in hybrid electric vehicle, and a power storage device, to which, however, the present invention is not limited.

The structure of the battery cell and a method of manufacturing the battery cell or the structure of the device and a method of manufacturing the device are well known in the art to which the present invention pertains, and therefore, a detailed description thereof will be omitted.

DESCRIPTION OF DRAWINGS

The above and other objects, features and other advantages of the present invention will be more clearly understood from the following detailed description taken in conjunction with the accompanying drawings, in which:

FIGS. 1A and 1B are exploded perspective views showing a conventional representative pouch-shaped secondary battery;

FIGS. 2 and 3 are a perspective view and a vertical sectional view typically showing electrode plates and a separator plate constituting a stacked type electrode group according to the present invention;

FIGS. 4 and 5 are vertical sectional views typically showing stacked type electrode groups configured to have a structure in which the uppermost electrode plate and the lowermost electrode plate have different polarities;

FIG. 6 is a vertical sectional view typically showing stacked type electrode groups configured to have a structure in which the uppermost electrode plate and the lowermost electrode plate have the same polarity;

FIG. 7 is a sectional view typically showing an electrode group stack according to an unlimited embodiment of the present invention;

FIG. 8 is a development view typically showing the electrode group stack of FIG. 7;

FIG. 9 is a sectional view showing the structure of a first unit cell according to an unlimited embodiment of the present invention;

FIG. 10 is a sectional view showing the structure of a second unit cell according to an unlimited embodiment of the present invention;

FIG. 11 is a sectional view showing the structure of a stacked type electrode group including the first unit cell of FIG. 9 and the second unit cell of FIG. 10;

FIG. 12 is a typical view showing a fixing structure of the first unit cell of FIG. 9;

FIG. 13 is a view typically showing a process of manufacturing a first unit cell according to an unlimited embodiment of the present invention; and FIG. 14 is a view typically showing a stepped structure having two steps.

BEST MODE

Now, preferred embodiments of the present invention will be described in detail with reference to the accompanying drawings. It should be noted, however, that the scope of the present invention is not limited by the illustrated embodiments.

A cathode plate 130, an anode plate 170, and a separator plate 150 constituting an electrode group according to the present invention are typically shown in FIGS. 2 and 3. Referring to FIGS. 2 and 3, the cathode plate 130 is configured to have a structure in which cathode slurry 132 is applied to a cathode current collector 136 and the anode plate 170 is configured to have a structure in which anode slurry 172 is applied to an anode current collector 176.

In the cathode plate 130 of FIG. 2, the cathode slurry 132 is applied to the top and bottom of the cathode current collector 136. In the anode plate 170 of FIG. 2, the anode slurry 172 is applied to the top and bottom of the anode current collector 176.

The cathode plate 130 and the anode plate 170 of FIGS. 2 and 3 are formed in the shape of a rectangular parallelepiped having an overall length L1, an overall width S1, and an overall height H.

FIGS. 4 to 6 are vertical sectional views typically showing stacked type electrode groups 300 and 400 configured to have a structure in which the cathode plate 130 and the anode plate 170 of FIG. 3 are alternately stacked in the height direction on the basis of a plane parallel to the stack plane in a state in which the separator plate 150 is disposed between the cathode plate 130 and the anode plate 170.

In stacked type electrode groups 210, 220, 230, 240, and 250 of FIGS. 4 and 5, the uppermost electrode plate and the lowermost electrode plate have different polarities.

In stacked type electrode groups 310, 320, and 330 of FIG. 6, on the other hand, the uppermost electrode plate and the lowermost electrode plate have the same polarity.

A cathode slurry layer is formed at only one major surface of the lowermost cathode plate of each of the stacked type electrode groups 220, 250, and 330 facing the anode plate stacked above the lowermost cathode plate.

FIG. 7 is a vertical sectional view showing an electrode group stack according to an unlimited embodiment of the present invention.

Electrode groups constituting an electrode group stack 500 shown in FIG. 7 may include a combination of the stacked type electrode groups of FIGS. 4 to 6.

Referring to FIG. 7, stacked type electrode groups 400A, 300B, 300D, 300F, and 300H having different areas are stacked. A step is formed at the interface between the stacked type electrode groups 400A and 300B. In addition, another step is also formed at the interface between the stacked type electrode groups 300D and 300H.

The stacked type electrode group 400A has a thickness equivalent to 60% the sum of heights of the stacked type electrode groups 400A, 300B, 300D, 300F, and 300H.

The stacked type electrode groups 300B, 300D, 300F, and 300H have the same thickness.

A separation sheet covers sides of the stacked type electrode groups 400A, 300B, 300D, 300F, and 300H. In addition, the separation sheet covers the outer circumference of the electrode group stack 500. The end of the separation sheet is fixed by taping.

FIG. 8 is a development view typically showing the electrode group stack of FIG. 7.

Referring to FIG. 8, the electrode group 400A having the largest area and thickness is disposed on the left edge of the separation sheet at which winding of the separation sheet is commenced. The electrode group 300B having a smaller area than the electrode group 400A is disposed on the separation sheet in the winding direction in a state in which the electrode group 300B is spaced apart from the electrode group 400A by a predetermined distance. The electrode group 300D having a smaller area than the electrode group 300B is disposed on the separation sheet in the winding direction in a state in which the electrode group 300D is spaced apart from the electrode group 300B by a predetermined distance. The electrode group 300F having a smaller area than the electrode group 300D is disposed on the separation sheet in the winding direction in a state in which the electrode group 300F is spaced apart from the electrode group 300D by a predetermined distance. The electrode group 300H having a smaller area than the electrode group 300F is disposed on the separation sheet in the winding direction in a state in which the electrode group 300H is spaced apart from the electrode group 300F by a predetermined distance.

FIG. 9 is a sectional view typically showing the structure of a first unit cell and FIG. 10 is a sectional view typically showing the structure of a second unit cell.

As shown in FIG. 9, the first unit cell is configured to have a structure in which a separator plate 310, a cathode plate 320, a separator plate 330, and an anode plate 340 are laminated while being sequentially stacked.

As shown in FIG. 10, the second unit cell is configured to have a structure in which a separator plate 410, an anode plate 420, and a separator plate 430 are laminated while being sequentially stacked.

FIG. 11 shows a stacked type electrode group configured to have a structure in which the second unit cell of FIG. 10 is stacked on the uppermost end of a first unit cell stack constituted by first unit cells, one of which is shown in FIG. 9.

FIG. 12 shows an embodiment in which a fixing member $T_1$ is added to the first unit cell of FIG. 9. Specifically, the fixing member $T_1$ is added to the side or the front of the first unit cell 300.

In order to secure stack stability of a simple stack structure, an additional fixing member may be added to the side of the stack structure to fix the stack structure. The fixing member may be realized as a tape $T_1$ surrounding the entire surface of the first unit cell 300 as shown in FIG. 12(a). Alternatively, the fixing member may be realized as a fixing member $T_2$ to fix only each side of the first unit cell 300 as shown in FIG. 12(b).

FIG. 13 is a view typically showing a process of manufacturing the first unit cell according to the present invention.

As shown in FIG. 13, materials for a separator plate 310, a cathode plate 320, a separator plate 330, and an anode plate 340 are simultaneously loaded (using sheet type loading units). The material for the cathode plate 320, which is used as a middle layer, is cut into a designed size and is then loaded into laminators $L_1$ and $L_2$. Subsequently, the materials for the separator plates 310 and 330, which are disposed under and above the material for the cathode plate 320, are simultaneously loaded into the laminators $L_1$ and $L_2$. At the same time, the material for the anode plate 340 is loaded into the laminators $L_1$ and $L_2$.

Subsequently, the laminators $L_1$ and $L_2$ form a structural body in which the two electrode plates and the two separator plates are laminated to each other using heat and pressure, i.e. a first unit cell. Subsequently, a cutter $C_3$ cuts the structural body into a plurality of first unit cells. Afterwards, various inspection processes, such as a thickness inspection (a), a vision inspection (b), and a short circuit inspection (c), may be performed with respect to each first unit cell.

Subsequently, each first unit cell manufactured as described above is fixed using a fixing member, and the first unit cells are stacked to constitute a structural body in which the first unit cells are stacked. Subsequently, the second unit cell shown in FIG. 10 is stacked on the structural body and then the second unit cell and the structural body are fixed using a fixing member, thereby completing a stacked type electrode group.

FIG. 14 is a view typically showing a stepped structure having two steps.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the electrode group stack according to the present invention includes a stepped structure changed based on the curvature of a curved portion of a device. Consequently, the present invention has an effect of increasing the capacity of the device per unit volume by utilizing a dead space defined in the device unlike a conventional electrode group stack.

In addition, the electrode group stack according to the present invention is manufactured at high yield without process difficulty, thereby improving process efficiency and price competitiveness.

The invention claimed is:

1. An electrode group stack comprising: a plurality of electrode groups, each of which comprises a cathode, an anode, and a first separator disposed between the cathode and the anode; and a second separator disposed between the electrode groups, wherein:
    the electrode groups are stacked in a height direction on the basis of a plane,
    some or all of the electrode groups have different areas of opposite stack surfaces at a stack interface therebetween to form a step at the stack interface, the step being defined by a first step surface that extends in the height direction and a second step surface that extends in a direction perpendicular to the height direction of adjacent electrode groups, and
    the electrode group stack comprises an electrode group satisfying equation (1):

$$T \geq (T\text{sum} \times 0.5) \tag{1}$$

where T indicates a thickness of an electrode group having the largest area of the stack surface and Tsum indicates a sum of thicknesses of the electrode groups constituting the electrode group stack;
    wherein each of the electrode groups is a stacked type electrode group comprising a cathode plate, an anode plate, and a first plate-shaped separator disposed between the cathode plate and the anode plate, the cathode plate and the anode plate being stacked in the height direction on the basis of the plane in a state in which a separator plate is between the cathode plate and the anode plate;
    wherein the second separator is a one-unit separation sheet that is disposed between the stacked type electrode groups to cover a top, a bottom, and sides of each of the stacked type electrode groups at which electrode terminals are not formed and to cover substantially an entire outer circumference of the electrode group stack; and
    wherein the second separator is disposed in contact with the first and second step surfaces at the respective steps.

2. The electrode group stack according to claim 1, wherein the separation sheet is disposed in contact with the sides of the stacked type electrode groups.

3. The electrode group stack according to claim 1, wherein one of the stacked type electrode groups having the largest area of the stack surface is an S stacked type electrode group, an uppermost electrode and a lowermost electrode of which have the same polarity.

4. The electrode group stack according to claim 3, wherein the S stacked type electrode group is an SA stacked type electrode group, an uppermost electrode and a lowermost electrode of which are anodes.

5. The electrode group stack according to claim 3, wherein the S stacked type electrode group is an SC stacked type electrode group, an uppermost electrode and a lowermost electrode of which are cathodes.

6. The electrode group stack according to claim 1, wherein one of the stacked type electrode groups having the largest area of the stack surface is a D stacked type electrode group, an uppermost electrode and a lowermost electrode of which have different polarities.

7. The electrode group stack according to claim 6, wherein the D stacked type electrode group has a minimum thickness of 0.3 mm.

8. The electrode group stack according to claim 1, wherein the electrode groups stacked on the electrode group having the largest area of the stack surface satisfy equation (2):

$$Ta = n \times Tb \qquad (2)$$

where Ta and Tb each indicate a thickness of an arbitrary electrode group selected from among the electrode groups stacked on the electrode group having the largest area of the stack surface, and n indicates a natural number.

9. The electrode group stack according to claim 8, wherein the arbitrary electrode groups comprises S stacked type electrode groups, D stacked type electrode groups, or a combination of the S stacked type electrode groups and the D stacked type electrode groups.

10. The electrode group stack according to claim 1, wherein the cathode has a cathode slurry layer formed only at an area of the cathode facing the anode.

11. The electrode group stack according to claim 1, wherein the anode has an anode slurry layer formed only at an area of the anode facing the cathode.

12. The electrode group stack according to claim 1, wherein the electrode group stack has a maximum thickness of 5.5 mm.

13. The electrode group stack according to claim 1, wherein one of the electrodes opposite to each other at the interface between the electrode groups, which has a larger opposite area, is an anode.

14. The electrode group stack according to claim 1, wherein one of the electrodes opposite to each other at the interface between the electrode groups, which has a larger opposite area, is a cathode.

15. The electrode group stack according to claim 1, wherein the stacked type electrode groups include a first unit cell configured to have a laminated structure in which a cathode plate, an anode plate, and separator plates are stacked such that (1) the cathode plate or the anode plate and (2) one of the separator plates are located at outermost sides of the stacked type electrode group.

16. The electrode group stack according to claim 15, wherein the stacked type electrode groups include a second unit cell configured to have a laminated structure in which a cathode plate, an anode plate, and separator plates are stacked such that the separator plates are located at outermost sides of the stacked type electrode group.

17. The electrode group stack according to claim 15, wherein one of separator plates constitutes a second separator.

18. The electrode group stack according to claim 1, wherein the electrode groups are stacked in the height direction and in a direction opposite to the height direction on the basis of the stacked type electrode group having the largest area of the stack surface.

19. The electrode group stack according to claim 1, wherein the number of the electrode groups is even.

20. The electrode group stack according to claim 1, wherein the number of the electrode groups is odd.

21. A lithium secondary battery comprising an electrode group stack according to claim 1, wherein the electrode group stack is mounted in a battery case.

22. The lithium secondary battery according to claim 21, wherein the battery case is formed of a laminate sheet comprising a resin layer and a metal layer or a metal container.

23. The lithium secondary battery according to claim 21, wherein the battery case is provided with a receiving part having an internal structure corresponding to an external structure of the electrode group stack.

24. The lithium secondary battery according to claim 21, wherein the lithium secondary battery is a lithium ion battery.

25. The lithium secondary battery according to claim 21, wherein the lithium secondary battery is a lithium polymer battery.

26. The lithium secondary battery according to claim 21, wherein the lithium secondary battery is a lithium ion polymer battery.

\* \* \* \* \*